United States Patent
Nenner

(10) Patent No.: US 9,210,639 B2
(45) Date of Patent: Dec. 8, 2015

(54) METHOD FOR THE USE OF A GSM/UMTS MOBILE COMMUNICATION NETWORK BY A USER EQUIPMENT ATTACHED TO A CORE NETWORK OF AN EVOLVED PACKET SYSTEM (EPS) MOBILE COMMUNICATION NETWORK

(75) Inventor: Karl Heinz Nenner, Bornheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 137 days.

(21) Appl. No.: 13/980,330

(22) PCT Filed: Jan. 26, 2012

(86) PCT No.: PCT/EP2012/000350
§ 371 (c)(1),
(2), (4) Date: Jul. 18, 2013

(87) PCT Pub. No.: WO2012/100946
PCT Pub. Date: Aug. 2, 2012

(65) Prior Publication Data
US 2013/0301466 A1 Nov. 14, 2013

Related U.S. Application Data

(60) Provisional application No. 61/436,693, filed on Jan. 27, 2011.

(30) Foreign Application Priority Data

Jan. 27, 2011 (EP) .................................. 11000654

(51) Int. Cl.
*G01R 31/08* (2006.01)
*H04W 36/30* (2009.01)
(Continued)

(52) U.S. Cl.
CPC .......... *H04W 36/30* (2013.01); *H04W 36/0022* (2013.01); *H04W 60/04* (2013.01)

(58) Field of Classification Search
CPC .. H04W 36/30; H04W 36/0022; H04W 60/04
See application file for complete search history.

(56) References Cited

U.S. PATENT DOCUMENTS

2005/0135255 A1*  6/2005  Drouet et al. ................. 370/237
2010/0202413 A1*  8/2010  Vikberg et al. ............... 370/332

(Continued)

FOREIGN PATENT DOCUMENTS

| EP | 2182758 A2 | 5/2010 |
| EP | 2472985 A1 | 7/2012 |
| WO | WO 2008088258 A1 | 7/2008 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 10)". 3GPP Standard; 3GPP TS 24.301. $3^{rd}$ Generation Partnership Project (3GPP). Mobile Competence Centre; No. V10.1.0. Dec. 21, 2010 pp. 1-305. XP050462346. [retrieved on Dec. 21, 2010] section 5.5.3.3.2 point 1) section 8.2.26.6 section 8.2.29.13.

(Continued)

*Primary Examiner* — Robert Wilson
(74) *Attorney, Agent, or Firm* — Leydig, Voit & Mayer, Ltd.

(57) ABSTRACT

A method for use of a Global System of Mobile Communication (GSM) and Universal Mobile Telecommunication System (UMTS) (GSM/UMTS) mobile communication network by a user equipment attached to a core network of an Evolved Packet System (EPS) mobile communication network, the use of the GSM/UMTS mobile communication network being the result of a fallback operation, includes, prior to an invocation of a service that triggers the fallback operation: performing an updating operation regarding assignment of a Location Area Code (LAC) and/or a serving Mobile Switching Center (MSC) to the user equipment; and/or performing, autonomously by the user equipment, a measurement operation regarding a current General Packet Radio System (GPRS)/EDGE Radio Access Network (GERAN) or UMTS Terrestrial Radio Access Network (UTRAN) (GERAN/UTRAN) radio environment in order to identify potential CSFB target cells of the user equipment.

5 Claims, 2 Drawing Sheets

(51) Int. Cl.
*H04W 36/00* (2009.01)
*H04W 60/04* (2009.01)

(56) References Cited

U.S. PATENT DOCUMENTS

| | | | | |
|---|---|---|---|---|
| 2010/0317375 | A1* | 12/2010 | Burbidge et al. | 455/458 |
| 2011/0064052 | A1* | 3/2011 | Lee | 370/331 |
| 2012/0020290 | A1* | 1/2012 | Kanauchi et al. | 370/328 |
| 2012/0120789 | A1* | 5/2012 | Ramachandran et al. | 370/220 |
| 2013/0301466 | A1* | 11/2013 | Nenner | 370/252 |

OTHER PUBLICATIONS

"3rd Generation Partnership Project; Technical Specification Group Services and System Aspects; Circuit Switched (CS) fallback in Evolved Packet System (EPS); Stage 2 (Release 10)". 3GPP Standard; 3GPP TS 23.272. $3^{rd}$ Generation Partnership Project (3GPP). Mobile Competence Centre, No. V10.2.1. Jan. 4, 2011, pp. 1-79. XP050462516. [retrieved on Jan. 4, 2011] section 5.4. B.3.

* cited by examiner 10 core network
20 user equipment
21 first radio interface
22 second radio interface
31 PSTN
32 internet EPS cell GSM/UMTS or GERAN/UTRAN cell

METHOD FOR THE USE OF A GSM/UMTS MOBILE COMMUNICATION NETWORK BY A USER EQUIPMENT ATTACHED TO A CORE NETWORK OF AN EVOLVED PACKET SYSTEM (EPS) MOBILE COMMUNICATION NETWORK

CROSS-REFERENCE TO RELATED APPLICATIONS

This application is a U.S. National Phase application under 35 U.S.C. §371 of International Application No. PCT/EP2012/000350, filed on Jan. 26, 2012, and claims benefit to European Patent Application No. EP 11000654.1, filed on Jan. 27, 2011, and to U.S. Provisional Application No. 61/436,693, filed on Jan. 27, 2011. The International Application was published in English on Aug. 2, 2012 as WO 2012/100946 A2 under PCT Article 21(2).

FIELD

The present invention relates inter alia to a method for the use of a GSM/UMTS mobile communication network by a User Equipment attached to a core network of an Evolved Packet System (EPS) mobile communication network.

BACKGROUND

The third Generation Partnership Project (3GPP) has specific functions for Evolved Packet System (EPS) networks and devices that allow them to use the traditional Circuit Switched (CS) services that are offered by Global System of Mobile Communication (GSM) and Universal Mobile Telecommunication System (UMTS) networks.

The motivation for this feature is that Circuit Switched (CS) services, such as today's voice and SMS services, are not available on the Evolved Packet System (EPS) due to the fact that Evolved Packet System (EPS) offers Packet Switched (PS) services only.

Hence functionality is needed to allow Evolved Packet System (EPS) terminals—while registered with the Evolved Packet System (EPS)—the use of GSM/UMTS Circuit Switched (CS) services in case there is no equivalent service available on the Evolved Packet System (EPS) network. For example, in the absence of a native "Voice-over-LTE" solution on the serving EPS network (or in case the terminal (or User Equipment) chooses for other reasons, such as its voice configuration, not to use the Evolved Packet System (EPS)), terminals may request the registration for Circuit Switched (CS) services via the Evolved Packet System (EPS), whereby the terminal is registered on the Circuit Switched (CS) domain of a GSM/UMTS mobile communication network (i.e. with a Mobile Switching Center (MSC) on the GSM/UMTS Circuit Switched (CS) domain) by the Evolved Packet System (EPS). Subsequently, the terminals may use the services offered by the Circuit Switched (CS) domain while they continue to be registered in the Evolved Packet System (EPS). In order to do this, the terminal tunes (from its serving cell in the Evolved Packet System (EPS)) to a GERAN (GPRS/EDGE radio access network) or UTRAN (UMTS Terrestrial radio access network) cell of a CS-enabled network when a CS service is invoked. This functionality is called Circuit Switched Fallback (CSFB) and is specified in Third Generation Partnership Project (3GPP) TS 23.272, e.g. in Version 9.5.0 of September 2010.

Circuit Switched (CS) refers to a domain of the GSM/UMTS mobile communication network whereby services are delivered via dedicated circuits.

Packet Switched (PS) refers to a network domain where services are delivered using statistical multiplexing of "packets", whereby packets are segments of the service data. It exists in Global System of Mobile Communication (GSM), Universal Mobile Telecommunication System (UMTS) and Evolved Packet System (EPS) mobile communication network.

Global System of Mobile Communication (GSM) refers to the 2G network as defined by the Third Generation Partnership Project (3GPP). Its radio access is termed GERAN.

Universal Mobile Telecommunication System (UMTS) refers to the 3G network as defined by the Third Generation Partnership Project (3GPP). Its radio access is termed UTRAN.

Evolved Packet System (EPS) refers to the 4G network as defined by the Third Generation Partnership Project (3GPP). Its radio access is termed E-UTRAN.

General Packet Radio System (GPRS) refers to the Packet Switched (PS) part (or domain) of Global System of Mobile Communication (GSM) and Universal Mobile Telecommunication System (UMTS) mobile communication networks.

According to ETSI TR 21.905 V8.8.0, the term MME stands for Mobile Management Entity; according to TS23.401, V8.6.0 this term stands for Mobility Management Entity; hereinafter, the term Mobility Management Entity is used.

In order to use services offered by a particular network domain, terminals (or User Equipments) must be registered with ("attached" to) that domain. Terminals may be attached to a single domain of the network only, i.e. just the EPS, or, while in GSM/UMTS, just the CS domain or just the PS domain. Alternatively, terminals may be attached to two domains; i.e. in EPS, they may be simultaneously attached to the EPS and the CS domain of the GSM/UMTS network; in GSM/UMTS, they may be simultaneously attached to the CS domain and the PS domain of the GSM/UMTS network.

For each network domain that the terminal (or User Equipment) is attached to, mobility management functions are necessary to cater for the movement of the terminals. These functions comprise, inter alia, the assignment of a "location identity" in each of the domains, and a serving node within the domain that serves the location represented by the location identity, as follows:

- in the CS domain of the GSM/UMTS network, a Location Area Identity (LAI) and a serving Mobile Switching Center (MSC) are assigned;
- in the PS domain of the GSM/UMTS network, a Routing Area Identity (RAI) and a Serving GPRS Support Node (SGSN) are assigned;
- in the EPS, a list of one or more Tracking Area Identities (TAI list) and a serving Mobility Management Entity (MME) are assigned.

Terminals (or User Equipments) detect their LAI/RAI/TAI from information broadcast by their serving cell, whereby a GERAN or UTRAN cell may broadcast a LAI and a RAI, and an E-UTRAN cell may broadcast a TAI. Network planning must ensure that the serving cell that broadcasts a given LAI/RAI/TAI is connected with a MSC/SGSN/MME that is configured to host this Location Area/Routing Area/Tracking Area. Appropriate signaling between the terminal (or User Equipment) and the network is in place for performing updates of the assigned LAI/RAI/TAI list when the terminal moves into a serving cell that broadcasts a LAI/RAI/TAI that is different to its current assignment.

When the terminal is idle, changes of the Location Area/ Routing Area/Tracking Area are notified to the network; such that:
- a Location Area Update (LAU) towards the MSC is invoked when the terminal moves into a new GERAN/ UTRAN serving cell that broadcasts a different LAI than the one currently assigned to the terminal;
- a Routing Area Update (RAU) towards the SGSN is invoked when the terminal moves into a new GERAN/ UTRAN serving cell that broadcasts a different RAI than the one currently assigned to the terminal;
- a Tracking Area Update (TAU) towards the MME is invoked when the terminal moves into a new E-UTRAN serving cell that broadcasts a TAI that is not within the list of TAIs currently assigned to the terminal.

Furthermore, when there is no need for the terminal to signal a change of LAI/RAI/TAI to the network (e.g. due to not moving out of its current assignment), the terminal may invoke the appropriate updating procedure based on periodicity timers provided by the network. If the terminal is registered to two domains as described above ("Alternatively, terminals may be attached to two domains . . . "), it may use "combined" procedures whereby, as appropriate, either the RAI or the LAI or both can be updated by sending a "combined RAU/LAU" request to the SGSN when the terminal is in GSM/UMTS, or either the TAI list or the LAI or both can be updated by sending a "combined TAU/LAU" request towards the MME when the terminal is in the EPS. Combined procedures are always used in the case of terminals that are simultaneously EPS/IMSI-attached, while the use of individual or combined procedures depends on network configuration in the case of terminals that are simultaneously IMSI/ GPRS-attached.

The updating procedures described above are used by terminals that are attached to the corresponding domain(s). In order to become attached to a domain, similar procedures are available ("IMSI Attach", "GPRS Attach", "EPS Attach"). Simultaneous attachment to two domains (as described above) can be achieved by "Combined IMSI/GPRS Attach" or "Combined EPS/IMSI Attach".

In contrast to LAI/RAI/TAI changes—which are always signaled when the terminal is idle and may be signaled when the terminal is active—changes of the GERAN/UTRAN/E-UTRAN serving cell are only notified to the network when the terminal is "active" (e.g. engaged in a voice call in the CS domain, or in data communication in the PS domain).

In line with the above, as a prerequisite to using the CS domain of the GSM/UMTS mobile communication network by means of Circuit Switched Fallback, terminals in EPS must register on the CS domain ("IMSI attach") in addition to being registered with the EPS ("EPS Attach"). Since the terminal (or User Equipment) is in EPS (and hence served by an E-UTRAN cell), requests by the terminals (or User Equipments) for registration on the CS-domain are sent to the Mobility Management Entity (MME) and then relayed by the Mobility Management Entity (MME) towards the Mobile Switching Center (MSC) via the SGs interface between the Mobility Management Entity (MME) and the Mobile Switching Center (MSC). This registration on the CS domain for terminals in EPS can thereby occur as follows:
- when the terminal (or User Equipment) registers with the EPS (i.e. performs an "EPS attach"): In this case, the terminal (or User Equipment) performs a "Combined Attach" as described above ("Simultaneous attachment to two domains (as described above) can be achieved by . . . ") that results in both EPS and IMSI attachment of the terminal or User Equipment;
- at a later stage after an EPS attachment: In this case, the terminal performs a "Combined Tracking Area Update" that includes the request (by the User Equipment) to become IMSI attached.

As described above, the Tracking Area Update (TAU) is the normal location updating procedure in EPS, equivalent to, e.g., Location Area Update (LAU) in the Circuit Switched (CS) domain, or Routing Area Update (RAU) in the Packet Switched (PS) domain of GSM/UMTS mobile communication networks. In the context of Circuit Switched Fallback (CSFB), the "combined" variant of the TAU is used to indicate that it applies to both EPS and IMSI attachment of the terminal. Furthermore, as explained in the preceding paragraph, Combined TAU can be used solely to request IMSI attachment by a terminal (or User Equipment) that is already EPS attached.

While the terminal (or User Equipment) is IMSI attached, a serving Mobile Switching Center (MSC), and a Location Area (LA) "within" that Mobile Switching Center (MSC), must be assigned to the terminal (or User Equipment). This requirement applies regardless of whether:
- the terminal is in GSM/UMTS and only attached to the CS domain; or
- the terminal is in GSM/UMTS and attached to both the CS domain and the PS domain; or
- the terminal is in the EPS and is "combined-attached" to both the EPS and the CS domain of the GSM/UMTS network.

However, it is very different how this assignment is performed and maintained for IMSI-attached terminals in EPS (i.e. those that want to make use of CSFB) and IMSI-attached terminals in GSM/UMTS, as further described below.

When the terminal (or User Equipment) is in a GSM/ UMTS mobile communication network, it communicates via a GERAN or UTRAN serving cell for access to both the CS domain and the PS domain. Its Location Area and its Routing Area equate to the LAI/RAI that are broadcast in that serving cell (in other words, the Location Area (LA) and the Routing Area (RA) of the User Equipment is the Location Area (LA) and the Routing Area (RA) of which the serving GERAN/ UTRAN cell is a member), and the Mobile Switching Center (MSC)/SGSN are determined based on network topology (i.e. a Mobile Switching Center (MSC)/SGSN is used that hosts the terminal's serving cell for the CS domain and the PS domain, respectively).

When the terminal (or User Equipment) is in the Evolved Packet System (EPS), it communicates via an E-UTRAN serving cell for access to the PS domain, and needs to switch to a GERAN/UTRAN cell when CSFB is invoked. This means that there is no serving GERAN/UTRAN cell for such a terminal in EPS and hence no LAI can be derived from the GERAN/UTRAN cells. Therefore, when the terminal signals to the MME that it wishes to become IMSI attached, the assignment of the Location Area in the Circuit Switched (CS) network and the selection of the appropriate Mobile Switching Center (MSC) (i.e. a Mobile Switching Center (MSC) that hosts this Location Area), is performed by the Mobility Management Entity (MME) based on local configuration, taking into account, e.g., the terminal's current Tracking Area in the Evolved Packet System (EPS) and its current serving E-UTRAN cell. In order to cater for the movement of the terminal, a new Location Area (LA) and if applicable—i.e. in case that the new Location Area (LA) belongs to another Mobile Switching Center (MSC)—a new Mobile Switching Center (MSC) may be selected by the Mobility Management Entity (MME), and assigned to the terminal, when the terminal signals a combined Tracking Area/Location Area Update towards the MME.

The triggers for sending a combined TAU/LAU are specified in 3GPP TS 24.301 and are independent of the LAI of any overlapping GSM/UMTS cell, which could serve as a potential CSFB target cell. While the terminal moves within the EPS (i.e. uses a E-UTRAN serving cell), a (combined) TAU (/LAU) is typically signaled when the UE moves into a new E-UTRAN serving cell whose TAI is not in the terminal's current TAI list, or—in the absence of any such mobility-caused TAU—when a periodic TAU timer provided by the network expires. Consequently, assignment of a LAI and serving MSC to the terminal does not take into account the (change of) LAI and hosting MSC of potential CSFB target cells in GERAN/UTRAN; rather, it is solely based on EPS network location information and associated updating triggers.

In the context of 3GPP Circuit Switched Fallback (CSFB), terminals (or User Equipments) may attach to the Circuit Switched (CS) domain for SMS only, or for all services offered by the Circuit Switched (CS) domain of the GSM/UMTS network:

Circuit Switched (CS) domain registration for SMS only ("SMS over SGs"): In this case, the terminal may send and receive SMS messages while it stays on the E-UTRAN radio access, whereby the messages will be transferred via the Mobile Switching Center (MSC); i.e. mobile originating messages will be sent by the terminal (or User Equipment) via E-UTRAN to the Mobility Management Entity (MME), which will pass them on to the Mobile Switching Center (MSC) via SGs, and the Mobile Switching Center (MSC) then passes them further on towards the Short Message Service Center (SMSC) as in the traditional GSM/UMTS CS-based SMS service. The inverted sequence (i.e. Short Message Service Center (SMSC)→Mobile Switching Center (MSC)→Mobility Management Entity (MME)→E-UTRAN→Terminal/User Equipment) takes place for mobile terminated SMS. In this mode of operation, the terminal (or User Equipment) always stays in E-UTRAN, i.e. it does not perform a fallback to a GERAN/UTRAN cell. Consequently, the choice of Mobile Switching Center (MSC) and Location Area (LA) is not relevant for the execution of the service (it is only relevant when the terminal (or User Equipment) moves between E-UTRAN coverage and GERAN/UTRAN coverage). This mode of operation is not relevant in the context of the present invention.

Circuit Switched (CS) domain registration for all Circuit Switched (CS) services: In this case the terminal will use SMS as described above, but for all other Circuit Switched (CS) services, the terminal or User Equipment performs a "fallback" to a radio access of the CS domain, i.e. a GERAN or an UTRAN cell. When a fallback is necessary, i.e. a Circuit Switched (CS) service other than SMS is invoked, a suitable GERAN or UTRAN target cell for the fallback is chosen by the Evolved Packet System (EPS) network, and the terminal is then commanded to tune to that (target) cell for the execution of the Circuit Switched (CS) service. In this mode of operation, it is highly beneficial for the service execution that the target cell of the fallback is within the Location Area (LA) that is currently assigned to the User Equipment, and that this actual Location Area (LA) (i.e. the one of the target cell)—and hence the target cell—is served by the Mobile Switching Center (MSC) currently assigned to the User Equipment.

The Circuit Switched Fallback (CSFB) operation as specified according to the Third Generation Partnership Project (3GPP) has a number of drawbacks.

Lack of Location Area/serving Mobile Switching Center (MSC) awareness when assigning LAC and MSC to the terminal:

As described, the Mobility Management Entity (MME) assigns the Location Area (LA) and the Mobile Switching Center (MSC) to the Circuit Switched Fallback (CSFB) terminal (or User Equipment). The selection of the Location Area Code (LAC) and the Mobile Switching Center (MSC) can only occur when the terminal becomes registered on the Circuit Switched (CS) domain via the MME, or when it performs a (combined) Tracking Area Update (TAU) (the triggers for TAU are specified in 3GPP standards). However, no information of the topology of the overlapping GSM/UMTS mobile communication network—especially the LAI and the hosting MSC of neighboring GERAN/UTRAN cells that would be potential CSFB target cells—is available when the selection is made. Rather, the choice of the Location Area Code (LAC) and Mobile Switching Center (MSC) in the GSM/UMTS Circuit Switched (CS) domain has to be based on EPS/E-UTRAN related location information of the terminal, i.e. Tracking Area identity and E-UTRAN serving cell identity.

Both the identity of the Tracking Area (TA) signaled by the terminal (or User Equipment), and the E-UTRAN cell in which the terminal communicates when it sends the Combined Attach or Combined TAU, may be taken into account by the Mobility Management Entity (MME) to identify the best-suited LAC, and choose a corresponding MSC. In this context, "best-suited" implies that there is a maximum likelihood that, when the User Equipment falls back to a GERAN or UTRAN cell in the Circuit Switched (CS) network, the target cell of the fallback is a member of the currently assigned Location Area, and hence hosted by the currently assigned Mobile Switching Center (MSC). This likelihood, however, depends on the degree of overlap between the EPS Tracking Areas and the GSM/UMTS Location Areas, which in turn depends on the willingness and ability of the Network Operator to achieve this overlap. For example:

Optimizing the network for this overlap by network planning deprives Operators of the highly desirable independent optimization of both the EPS and the GSM and UTRAN networks. It also constitutes a problem due to the fact that a terminal may be assigned only one Location Area (LA) in GSM/UMTS, but one or more Tracking Areas in EPS;

The level of overlap that can be achieved also depends on the different radio frequencies being used in GSM, UMTS and EPS, as the propagation characteristics of the radio signals are very different between e.g. GSM900 and EPS2600;

If the configuration/topology of at least one of the two network layers—EPS and/or the GSM/UMTS Circuit Switched (CS) network—changes, the level of overlap between them changes as well. This represents a constant operational burden on the Operator. In case, e.g., a new Evolved Packet System (EPS) network is still in the roll-out/expansion process, it is very difficult and cumbersome to manage the overlap between the Location Areas (LAs) and the Tracking Areas (TAs).

In summary, the level of overlap is difficult to maintain and will always be a compromise between various factors.

In case that there is a mismatch of the Location Area (LA) when the User Equipment performs a fallback, a LAU procedure has to be performed prior to setting up the Circuit Switched (CS) service, e.g. a voice call, adding significant delay to the call setup time. In the worst case, even the Mobile Switching Center (MSC) hosting the target cell of the fallback is not the one that is currently assigned to the terminal—additional delay in setting up the call incurs for both mobile originated and mobile terminated calls. In the latter case, the call attempt will even fail, and additional functionality in the network ("roaming retry") is needed to recover from that failure by performing a second call attempt to the "correct" Mobile Switching Center (MSC), adding even more delay to the call setup time.

The effect of this problem (delay in call setup) doubles in principle when both calling party and called party employ CSFB.

Insufficient precision in relation to updating the LAI and MSC assignment of the terminal:

As described above, LAI and MSC reassignment for a CSFB terminal can only be performed when a TAU occurs. However, the TAU can only convey location information relative to the E-UTRAN cell and its TAI, but not information relevant to the LAI and hosting MSC of potential CSFB target cells in GERAN/UTRAN. In addition, mobility-triggered TAU only occurs when the terminal enters a cell outside of its TAI list, whereas in GSM/UMTS, an update of the LAI would have to occur when the terminal moves into a cell with a different, single, LAI than the one that is currently assigned. It is therefore very likely that the LAI of the surrounding GERAN/UTRAN cell changes while the terminal stays within a set of E-UTRAN cells coherent to its TAI list. If this happens, a mismatch of the LAI, and possibly the hosting MSC, occurs upon CSFB execution.

Lack of knowledge of current GERAN/UTRAN radio environment when performing a fallback:

When a fallback is needed, the terminal is sent to a GERAN or UTRAN cell in the CS domain in order to execute the CS service. As described above, a suitable target cell is selected by the EPS network, where in this context the term "suitable" implies that the target cell provides sufficient coverage for the service delivery to the UE. If this is not the case, a handover (to another GERAN/UTRAN cell) may be needed shortly after the fallback, or in the worst case the call setup will fail if the chosen target cell does not provide decent coverage for the UE when the fallback has been performed.

To avoid this from happening, the 3GPP standards foresee that, when a fallback is triggered, the terminal can be commanded by the network to perform GERAN/UTRAN neighbor cell measurements in order to identify potential target GERAN/UTRAN cells for the fallback. Once these measurements are completed, the network picks the preferred target cell based on the evaluation of the measurement results. While this assures that the chosen target cell will provide good coverage for the UE after fallback, it is also obvious that these measurements increase the overall call setup time in Circuit Switched Fallback (CSFB).

In order to avoid the additional delay incurred by the above measurements, it is also possible to perform a so-called "blind handover". In this case, the CSFB target cell in GERAN or UTRAN is chosen based on the terminal's current E-UTRAN cell, i.e. the E-UTRAN cell from which the CSFB is triggered. This relies on the assumption that for every serving E-UTRAN cell in the EPS network, at least one suitable target cell in GERAN or UTRAN is known. However, this is very unreliable as the exact location of the UE within the E-UTRAN cell's perimeter is not known, and also due to the different propagation characteristics of the E-UTRAN cells (e.g. 2600 MHz) compared with GERAN cells (e.g. 900 MHz). In conclusion, blind handover may only be suitable—in terms of acceptable fallback failure rates—for collocated cells in similar frequency bands (e.g. a E-UTRAN cell in the digital dividend band collocated with the GERAN cell in the 900 MHZ band, whereby the collocated GERAN cell is chosen as the CSFB target cell for every fallback that is triggered in the said E-UTRAN cell).

Lack of Location Area/serving Mobile Switching Center (MSC) awareness of the target cell when the fallback occurs: As described above, a target cell for the fallback is chosen by the network from the list of suitable cells that is obtained via configuration, or by the measurements performed by the terminal as commanded by the network. However, the choice of target cell does not take into account whether the target cell is in the same location area as the one that is currently assigned to the terminal, which increases the probability of a LAI mismatch (and possibly a MSC mismatch) even if cells in the same LA, or at least within another LA that is hosted by the currently assigned MSC, are available for the target cell choice.

SUMMARY

In an embodiment, the present invention provides a method for use of a Global System of Mobile Communication (GSM) and Universal Mobile Telecommunication System (UMTS) (GSM/UMTS) mobile communication network by a user equipment attached to a core network of an Evolved Packet System (EPS) mobile communication network. The use of the GSM/UMTS mobile communication network is the result of a fallback operation. The method includes, prior to an invocation of a service that triggers the fallback operation: performing an updating operation regarding assignment of a Location Area Code (LAC) and/or a serving Mobile Switching Center (MSC) to the user equipment, the updating operation being: a dedicated operation specific to the assignment or reassignment of the LAC and/or the serving MSC; or a modified Tracking Area Update (TAU) operation; and/or performing, autonomously by the user equipment, a measurement operation regarding a current General Packet Radio System (GPRS)/EDGE Radio Access Network (GERAN) or UMTS Terrestrial Radio Access Network (UTRAN) (GERAN/UTRAN) radio environment in order to identify potential CSFB target cells of the user equipment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
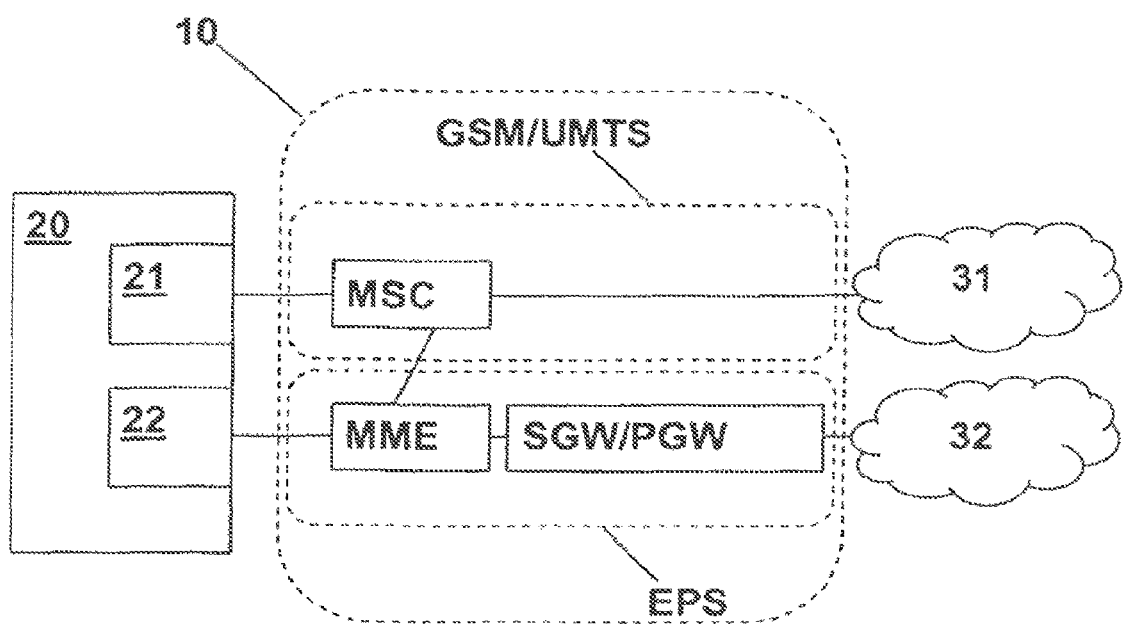
FIG. 1 schematically illustrate a User Equipment (or a terminal) attached to an Evolved Packet System (EPS) and to a GSM/UMTS radio access network.

In an embodiment, the present invention provides a method for the use of a GSM/UMTS mobile communication network by a User Equipment attached to a core network of an Evolved Packet System mobile communication network, wherein the use of the GSM/UMTS mobile communication network is the result of a fallback operation, wherein the fallback operation is enhanced such that an increased service level—and especially a reduction in delay times—can be achieved.

A method is provided for the use of a GSM/UMTS mobile communication network by a User Equipment attached to a core network of an Evolved Packet System (EPS) mobile communication network, wherein the use of the GSM/UMTS mobile communication network is the result of a fallback operation, wherein prior to an invocation of a service that triggers the fallback operation at least one of the following steps occurs:

an updating operation regarding the assignment of a Location Area Code (LAC) and/or a serving Mobile Switching Center (MSC) to the User Equipment is performed, the updating operation being a dedicated operation specific to the assignment or reassignment of the Location Area Code (LAC) and/or the serving Mobile Switching (MSC) or a modified TAU operation, and/or a measurement operation regarding a current GERAN/UTRAN radio environment in order to identify potential CSFB target cells of the User Equipment is performed autonomously by the User Equipment.

Embodiments of the present invention generally relate to CSFB (CS Fallback), irrespective of a specific implementation or a specific standard according to which a given Public Land Mobile Network (PLMN) is deployed. In the context of the present invention, the term "EPS" is primarily used as an example for a PS network (or PS domain of a network) from which CSFB may occur, whereas the terms "GSM", "UMTS", or "GSM/UMTS" are used as examples for CS networks (or networks having a CS domain) to which CSFB may occur. However, embodiments of the present invention also relate to other PS networks or PS only networks from which a CSFB operation can be performed and to other CS networks or CS domains of networks to which a CSFB operation can be performed, such as, e.g., CDMA2000.

In an embodiment, the updating operation and/or the measurement operation regarding the current GERAN/UTRAN radio environment/potential CSFB target cells of the User Equipment is executed in case that the User Equipment is attached to the Evolved Packet System (EPS) and to the GSM/UMTS mobile communication network, and the User Equipment is served by an E-UTRAN cell.

It is thereby advantageously possible to provide a method that ensures that an update of the assigned Location Area (LA), and potentially Mobile Switching Center (MSC), can be performed when the candidate target cells for a fallback of the User Equipment have changed in a way that they belong to a different Location Area, and potentially the new location area is served by a different Mobile Switching Center (MSC), than the ones currently assigned to the User Equipment.

In standard Circuit Switched Fallback (CSFB)—according e.g. to the Third Generation Partnership Project (3GPP) TS 23.272, e.g. in Version 9.5.0 of September 2010—, assignment of Location Area (LA) and selection of Mobile Switching Center (MSC) can only be done when the User Equipment
registers for Circuit Switched (CS) services (using combined attach or combined TAU as described above), or
performs a combined TAU according to the triggers defined in 3GPP standards (such as TS 23.272 (e.g. in Version 9.5.0 of September 2010), TS 23.401 (e.g. in Version 9.6.0 of September 2010)), including e.g. a periodic TAU.

The Attach/TAU messages may then be used by the Mobility Management Entity (MME) to (re-)assign a Location Area (LA) based on the terminal's current Tracking Area (TA) and E-UTRAN serving cell, and to select a Mobile Switching Center (MSC) that serves the chosen Location Area (LA). According to the state of the art per 3GPP TS 24.301, the triggers for performing a TAU may only take into account the current E-UTRAN radio environment and are independent of (a change of) the GERAN/UTRAN radio environment and hence a change of the potential CSFB target cells and their LAC/MSC.

In an embodiment, using an updating operation regarding the assignment of a Location Area Code (LAC) and/or a serving Mobile Switching Center (MSC) to the User Equipment, it is advantageously possible to achieve a higher service level for CSFB, inter alia by means of the following measures:

it is possible and preferred that the updating operation is performed more often compared to a standard TAU operation (according, e.g., to Version 9.5.0 of TS 23.272 and Version 9.6.0 of TS 23.401) when the terminal or User Equipment is combined-attached, so that the network is more frequently updated on the current serving E-UTRAN cell of the User Equipment; including the case that the updating operation is performed periodically but has a repetition period which is reduced compared to a TAU operation using timer 3412;

it is possible and preferred that the updating operation is performed every time that the serving E-UTRAN cell changes;

it is possible and preferred that the updating operation is performed after a maximum time has elapsed since the last updating operation, or since the terminal last changed from active mode (where its serving cell is known in the network) to idle mode (where its location is only known by the list of TAs assigned to it);

it is possible and preferred that the updating operation is performed on request from the core network, as the knowledge of the serving E-UTRAN cell, that is always available to the Mobility Management Entity (MME) when the User Equipment is in active state in the E-UTRAN, can also be used by the Mobility Management Entity (MME) for updating the Location Area (LA) and if necessary Mobile Switching Center (MSC) assignment, e.g. by means of commanding the User Equipment to perform an updating operation;

it is possible and preferred that the updating operation is performed when the terminal detects that it has moved, or moved for at least a certain distance from its location at the previous updating operation; this can, e.g., be detected by means of a GPS sensor and/or by means of an acceleration sensor and/or by monitoring the overall radio environment for changing conditions, such as different serving/neighbor cells, different signal strength of the serving and/or receivable neighbor cells, or different positions relative to the serving and/or receivable neighbor cells ("timing advance")

(observing the overall radio environment with the same radio as used in Evolved Packet System (EPS) might be limited, therefore this observation could be performed by means of a second radio part (or radio interface) in the terminal that scans the terminal's radio environment, especially outside of the current radio usage of the terminal's first radio part (e.g. the first radio part (or first radio interface) is active on E-UTRAN, the second radio part (or second radio interface) observes GERAN/UTRAN, or E-UTRAN cells/frequencies that are not currently monitored by the first radio part); the use of a second radio interface for enhancing a fallback operation is described in European Patent Application no. 10 016 164.5, filed Dec. 29, 2010 incorporated herein by reference in its entirety);

it is possible and preferred that the updating operation is performed when the terminal has detected that (some of) the candidate target cells for a CSFB (i.e. the receivable GERAN/UTRAN neighbor cells) belong to a different LA than the one that is currently assigned to it. In order to know this, the terminal needs to obtain the LAC broadcast by the said cells. In a single-radio terminal (i.e. standard CSFB), the opportunities for the terminal to obtain the LA of the GERAN/UTRAN neighbor cells is limited, especially when the terminal is active on E-UTRAN. In contrast, a terminal employing dual radio CSFB as per European Patent Application no. 10 016 164.5, filed Dec. 29, 2010, could observe the GERAN/UTRAN neighbor cells at any time, even constantly if so desired. Alternatively, the terminal could employ a second radio (module) for observation of the GERAN/UTRAN neighbor cells even when the second radio (module) is not designed, or used, as a (complete) second radio interface for dual-radio Circuit Switched Fallback (CSFB); in fact, only a second receiver would be needed in the terminal for this purpose. Observation of GERAN/UTRAN neighbor cells could be controlled (i.e. activated/deactivated) by the terminal getting aware of location change, e.g. as described above for the triggering of the update operation;

it is possible and preferred to exchange additional information during the updating operation compared to the TAU procedure as presently defined in the 3GPP standards (such as Version 9.5.0 of TS 23.272 and Version 9.6.0 of TS 23.401). Using the updating operation according to embodiments of the present invention without any additional information compared to a TAU procedure as presently defined in the 3GPP standards (such as Version 9.5.0 of TS 23.272 and Version 9.6.0 of TS 23.401), only yields gain if the serving E-UTRAN cell of the User Equipment has changed compared to the one that was last known in the network for this User Equipment: In case of an updating operation (such as a standard TAU operation) performed where there is no change of location information that is signaled to the Mobility Management Entity (MME) compared to the last-known location information (i.e. serving cell and its Tracking Area (TA)), it is not possible for the Mobility Management Entity (MME) to perform a better LA/MSC assignment. The following information are proposed to be used during the updating operation:

information on the current receivable GERAN/UTRAN neighbor cells and/or their Location Area as described above;

information on the current receivable E-UTRAN neighbor cells and/or their Tracking Area Information on the movement that the terminal has performed since the last updating operation, such as
changes in the overall radio environment (where such changes may have been observed by the single radio, or in case of a dual-radio terminal, by the second radio, as described above)
information gathered from an acceleration sensor
information gathered from a GPS sensor, such as absolute position or position change since last update.

Each of these mentioned mechanisms can be performed autonomously by the terminal, or if and when commanded by the network. The parameters, such as periodicity of the updating operation, minimum amount of location change, etc., can either be determined autonomously by the terminal (e.g. preconfigured or configured via a GUI (Graphical User Interface)), or set by the network via signaling or via OTA mechanisms (Over The Air mechanisms).

Additionally, knowledge of the serving E-UTRAN cell, that is always available to the Mobility Management Entity (MME) when the User Equipment is in active state in the E-UTRAN, can also be used by the Mobility Management Entity (MME) for updating the Location Area (LA) and if necessary Mobile Switching Center (MSC) assignment. This can be done by the network commanding the User Equipment to perform a TAU operation, followed by a normal combined updating procedure, in order to use the LA reassignment mechanism as per 3GPP standard, which only works in the context of a TAU operation. Alternatively, it is possible to add a different mechanism (such as a modified TAU operation or a dedicated operation, i.e. an exchange of messages between the User Equipment and the network) for the execution of the LA/MSC updating, including e.g. the use of the updating procedure described above.

According to embodiments of the present invention, it is possible and preferred that an observation of GERAN/UTRAN neighbor cells of a User Equipment for the purpose of detecting whether (some of) the candidate target cells for a CSFB (i.e. the receivable GERAN/UTRAN neighbor cells) belong to a different LA than the one that is currently assigned to it, is controlled (e.g. the observation is activated/deactivated) by the terminal based on an information about a movement or a location change of the User Equipment getting aware of such a location change, this behavior being possible to be realized both for a User Equipment having only one radio interface or having two radio interfaces. Likewise, it is possible and preferred to activate the said observation of GERAN/UTRAN neighbor cells of a User Equipment based on any of the triggers defined for the updating operation. It is possible and preferred that only one updating operation is performed in case that the LAC determination as described above shows that a change in the LAC(s) has occurred, and that an updating operation is executed.

According to a preferred embodiment of the present invention, it is advantageously possible that the TAU procedure as defined in 3GPP standards is employed as the updating operation (i.e. standard TAU operations (according to the present standard such as Version 9.5.0 of TS 23.272 and Version 9.6.0 of TS 23.401) are used in an unchanged manner but more often, i.e. additional TAU operations are used) when no additional information (compared to the information exchanged during the TAU operation) as described above is needed and/or available.

According to another preferred embodiment of the present invention, it is advantageously possible to implement the updating operation such that the standard TAU operation (according to the present standard such as Version 9.5.0 of TS 23.272 and Version 9.6.0 of TS 23.401) is modified (i.e. a modified TAU operation is used) such that the additional triggers and/or the additional information are applied. The modification of the TAU operation (with regard to the present standard such as Version 9.5.0 of TS 23.272 and Version 9.6.0 of TS 23.401) according to the present invention with only the application of the additional triggers results in a modified TAU operation that is mainly an additional TAU operation.

In any circumstances, where a standard TAU operation and an additional or modified TAU operation is to be executed in close timely proximity, it is possible and preferred to execute only (i.e. instead of the standard TAU operation) the additional TAU operation or the modified TAU operation.

According to yet another preferred embodiment of the present invention, it is advantageously possible that a (new) dedicated operation (exchange of messages between the User Equipment and the network) is used for the purpose of the updating operation.

According to yet another preferred embodiment of the present invention, it is advantageously possible that a combination of TAU operation, modified TAU operation and dedicated operation is used for the purpose of the updating operation.

According to embodiments of the present invention, it is furthermore advantageously possible to provide a method that ensures that a suitable target cell for a fallback operation is already known when the fallback operation is imminent.

In standard Circuit Switched Fallback (CSFB)—according e.g. to the Third Generation Partnership Project (3GPP) TS 23.272, e.g. in Version 9.5.0 of September 2010—the network may select a suitable GERAN/UTRAN target cell for the fallback operation when the fallback is invoked by performing measurements for the purpose of identifying the possible target cells at that instance. Alternatively, if measurements are not performed in order to avoid the incurred call set-up delay ("blind handover"), the probability of fallback failure increases.

According to embodiments of the present invention, using a measurement operation regarding a current GERAN/UTRAN radio environment (receivable neighbor cells/potential CSFB target cells) of the User Equipment it is advantageously possible to achieve a higher service level for CSFB. Thereby, it is advantageously possible to
avoid the risk of fallback failure caused by "blind handover" but also to
avoid the extra call setup delay incurred in standard CSFB by triggering GERAN/UTRAN neighbor cell measurements for the purpose of identifying a suitable CSFB target cell when the fallback is invoked. By means of the measurement operation regarding the current GERAN/UTRAN radio environment of the User Equipment in the GSM/UMTS mobile communication network, it is possible to assure that the necessary current GERAN/UTRAN neighbor cell knowledge, such as the identity and signal strength and quality of potential CSFB target cells, is already present when the fallback is invoked. This can be achieved by the terminal obtaining such information proactively prior to the fallback event, employing one or more of the following methods:
the terminal measuring constantly its GERAN/UTRAN radio environment (In a single-radio terminal, this could be somewhat limited, especially when the User Equipment is active in E-UTRAN);
the terminal measuring its GERAN/UTRAN radio environment by means of a second radio interface (or second receiver);
the terminal measuring its GERAN/UTRAN radio environment occasionally, where the trigger for activating the measurement being the same as the triggers for the updating operation described above;
the terminal measuring its GERAN/UTRAN radio environment when a (Circuit Switched (CS)) related application of the User Equipment, e.g. the telephony application, is activated via the GUI (Graphical User Interface) in anticipation of a "mobile originated fallback". According to the present invention, it is preferred that the terminal does not signal the measurement activity to the network. Rather, the terminal will acquire updated GERAN/UTRAN neighbor cell information for itself according to its use of the above methods, and in addition a validation timer is preferably used to determine when the neighbor cell information is outdated ("too old"). This validation timer (especially defining a predefined time interval or being dependent on the state of movement of the User Equipment) can be combined with other information to determine that the current GERAN/UTRAN neighbor cell information is outdated, such as movement of the terminal, or change of overall radio environment as described above.

It is advantageous according to the present invention that by means of the measurement operation regarding the current GERAN/UTRAN radio environment of the User Equipment, when a fallback occurs and the network requests the terminal to perform neighbor cell measurements, the terminal can then instantaneously return its currently stored neighbor cell information, i.e. according to its latest information acquisition as described above; the terminal then returns its measurement results to the network, and the Circuit Switched Fallback (CSFB) procedure continues as normal (i.e. according to the Third Generation Partnership Project (3GPP) standard). Alternatively, it is also possible according to the present invention that the User Equipment returns this information only if it is not currently declared "outdated", and otherwise performs new measurements at the time when the fallback occurs. As in the case of new measurements at the time of fallback there is no service level advantage over the standard CSFB as defined in 3GPP, it is preferred according to the present invention to avoid situations where the terminal's information regarding the GERAN/UTRAN radio environment is outdated.

According to a further preferred embodiment of the present invention, measurement operation regarding the current GERAN/UTRAN radio environment of the User Equipment in the GSM/UMTS mobile communication network is dependent on at least one of the following:
the measurement operation regarding the current GERAN/UTRAN radio environment of the User Equipment has a predetermined repetition period,
the measurement operation regarding the current GERAN/UTRAN radio environment of the User Equipment is executed in case that a serving E-UTRAN cell changes,
the measurement operation regarding the current GERAN/UTRAN radio environment of the User Equipment is executed in case that the User Equipment detects a movement of the User Equipment,
the measurement operation regarding the current GERAN/UTRAN radio environment of the User Equipment is executed in case that the User Equipment detects that at least one of the candidate target GERAN/UTRAN cells for a fallback operation belong to a different location area than the one that is currently assigned to the User Equipment.

According to a further embodiment of the present invention, it is preferred that the identity of the potential CSFB target cells includes the LAI of the said cells. The LAI is then taken into account by the network when the actual CSFB target cell is selected in a way that preferably a cell within the Location Area that is currently assigned to the User Equipment is chosen, thereby eliminating the need for a LAU in the target cell. Alternatively, if no such cell is identified within the measurement results returned to the network, a cell whose LAI is known to be served by the same MSC that is currently assigned to the User Equipment is chosen, thereby eliminating the occurrence of a MSC mismatch.

Each of the mechanisms mentioned can be performed autonomously by the terminal, or if and when commanded by the network. The parameters, such as periodicity of measurements, minimum amount of location change, etc., can be determined autonomously by the terminal (e.g. preconfigured or configured via the GUI), or set by the network via signaling or OTA mechanisms.

According to embodiments of the present invention, it is furthermore preferred that the User Equipment comprises a first radio interface and a second radio interface, the first radio interface being able to be used for a communication of the User Equipment in the Evolved Packet System (EPS) and the second radio interface being able to be used for a communication of the User Equipment in the GSM/UMTS mobile communication network or to at least measure the radio environment of the User Equipment, wherein the monitoring operation regarding the overall current radio environment of the User Equipment, or the measurement operation regarding the receivable GERAN/UTRAN neighbor cells, or the observation to detect that (some of) the candidate target cells for a CSFB (i.e. the receivable GERAN/UTRAN neighbor cells) belong to a different Location Area than the one that is currently assigned to the User Equipment, is performed using the second radio interface.

Thereby, it is advantageously possible according to the present invention, that the first radio interface assures the communication with the Evolved Packet System (EPS) and the second radio interface provides the monitoring/measurement/observation operation(s) described above. This behavior is possible to combine with the Circuit Switched Fallback (CSFB) mechanism described in European Patent Application no. 10 016 164.5, filed Dec. 29, 2010 incorporated herein by reference in its entirety. Alternatively, this functionality of providing the monitoring/measurement/observation operation(s) described above can also be performed by adding a second radio interface, or only a second receiver (i.e. no complete radio interface) in the User Equipment (without any relation to dual-radio Circuit Switched Fallback (CSFB)).

Embodiments of the present invention also relate to a User Equipment for the use of a GSM/UMTS mobile communication network by the User Equipment being attached to a core network of an Evolved Packet System (EPS) mobile communication network, wherein the use of the GSM/UMTS mobile communication network is the result of a fallback operation, wherein the User Equipment is provided such that an updating operation regarding the assignment of a Location Area Code (LAC) and/or a serving Mobile Switching Center (MSC) to the User Equipment is performed, the updating operation being
a dedicated operation specific to the assignment or reassignment of the Location Area Code (LAC) and/or the serving Mobile Switching (MSC) or
a modified TAU operation and/or
a measurement operation regarding the current GERAN/UTRAN radio environment in order to identify potential CSFB target cells of the User Equipment is performed, autonomously by the User Equipment, prior to an invocation of a service that triggers the fallback operation.

According to embodiments of the present invention, it is preferred that the execution of the updating operation is dependent on at least one of a plurality of triggers as described above, such as a reduced repetition period compared to a TAU operation using timer 3412, execution of the updating operation in case that a serving E-UTRAN cell changes, execution after a maximum time period after the last change from active mode to idle mode, etc.

Furthermore, it is preferred according to embodiments of the present invention that the updating operation includes the exchange of at least information as described above.

According to embodiments of the present invention, it is furthermore preferred that the measurement operation regarding the current radio environment of the User Equipment in the GSM/UMTS mobile communication network is dependent on at least one of the following:
the measurement operation regarding the current GERAN/UTRAN radio environment of the User Equipment has a predetermined repetition period,
the measurement operation regarding the current GERAN/UTRAN radio environment of the User Equipment is executed in case that a serving E-UTRAN cell changes,
the measurement operation regarding the current GERAN/UTRAN radio environment of the User Equipment is executed in case that the User Equipment detects a movement of the User Equipment,
the measurement operation regarding the current GERAN/UTRAN radio environment of the User Equipment is executed in case that the User Equipment detects that at least one of the candidate target GERAN/UTRAN cells for a fallback operation belong to a different location area than the one that is currently assigned to the UE,
the measurement operation regarding the current GERAN/UTRAN radio environment of the User Equipment is executed in case that an application of the User Equipment is activated typically requiring GSM/UMTS connectivity, especially a telephony application.
Furthermore, it is preferred that
the User Equipment comprises
a GNSS (Global Navigational Satellite System) module and/or
an acceleration sensor
for detecting a movement or a change of the position of the User Equipment and/or that the User Equipment comprises a first radio interface and a second radio interface, the first radio interface being able to be used for a communication of the User Equipment in the Evolved Packet System (EPS) and the second radio interface being able to be used for a communication of the User Equipment in the GSM/UMTS mobile communication network (or to at least measure the radio environment of the User Equipment, wherein the monitoring operation regarding the overall current radio environment of the User Equipment, or the measurement operation regarding the receivable GERAN/UTRAN neighbor cells, or the observation to detect that (some of) the candidate target cells for a CSFB (i.e. the receivable GERAN/UTRAN neighbor cells) belong to a different Location Area than the one that is currently assigned to the User Equipment, is performed using the second radio interface.

Embodiments of the present invention also relate to core network of an Evolved Packet System (EPS) mobile communication network for the use of a GSM/UMTS mobile communication network by a User Equipment being attached to the core network, wherein the use of the GSM/UMTS mobile communication network is the result of a fallback operation, wherein the User Equipment is provided such that the updating operation is a dedicated operation specific to the assignment or reassignment of the Location Area Code (LAC) and/or the serving Mobile Switching (MSC) or a modified TAU operation and/or a measurement operation regarding a current GERAN/UTRAN radio environment in order to identify potential CSFB target cells of the User Equipment (20) is performed autonomously by the User Equipment.

Furthermore, embodiments of the present invention relate to a program comprising a computer readable program code for controlling a User Equipment attached to a core network of an Evolved Packet System (EPS) mobile communication network for the use of a GSM/UMTS mobile communication network by a User Equipment being attached to the core network, wherein the use of the GSM/UMTS mobile communication network is the result of a fallback operation, wherein the User Equipment is provided such that an updating operation is a dedicated operation specific to the assignment or reassignment of the Location Area Code (LAC) and/or the serving Mobile Switching (MSC) or a modified TAU operation and/or a measurement operation regarding a current GERAN/UTRAN radio environment in order to identify potential CSFB target cells of the User Equipment (20) is performed autonomously by the User Equipment.

Embodiments of the present invention also relates to computer program product comprising an inventive program.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

In FIG. 1, a User Equipment 20 (or a terminal 20) attached to a core network 10 is schematically shown, the core network 10 being a core network 10 of an Evolved Packet System (EPS) and of the CS domain of a GSM/UMTS mobile communication network. According to one embodiment, the User Equipment 20 comprises a first radio interface 21 and a second radio interface 22. Thereby, it is possible according to the present invention that different radio parts or radio modules are used to support simultaneous access:

- via a GERAN/UTRAN radio access towards the Circuit Switched (CS) part of the core network 10 that may be connected, e.g., to a PSTN (Public Switched Telephone Network) 31 (e.g. for making calls to the PSTN), and
- via a E-UTRAN radio access to the Packet Switched (PS) part of the core network 10 that may be connected, e.g. to the internet 32 (e.g. for accessing a web page).

Alternatively, the first radio interface 21 is used to support access both via the GERAN/UTRAN radio access towards the Circuit Switched (CS) part of the core network 10 and via the E-UTRAN radio access to the Packet Switched (PS) part of the core network 10 (especially using a Circuit Switched Fallback (CSFB) operation, the second radio interface 22 being used to monitor, observe or measure the (overall) radio environment and the LACs of the receivable GERAN/UTRAN neighbor cells of the User Equipment 20.

According to an alternative embodiment (not represented in FIG. 1) of the present invention, the User Equipment 20 comprises only the first radio interface 21 and no second radio interface.

According to still another alternative embodiment of the present invention, the second radio interface 22 is only a receiver element for monitoring/observing/measuring the (overall) radio environment and the LACs of the receivable GERAN/UTRAN neighbor cells of the User Equipment 20.

The Packet Switched (PS) part of the core network 10 comprises the Mobility Management Entity (MME) related to the User Equipment 20 as well as the SGW/PGW (SGW: Serving GateWay; PGW: Packet data GateWay) entity. The Circuit Switched (CS) part of the core network 10 comprises the Mobile Switching Center (MSC).

Figure 2:
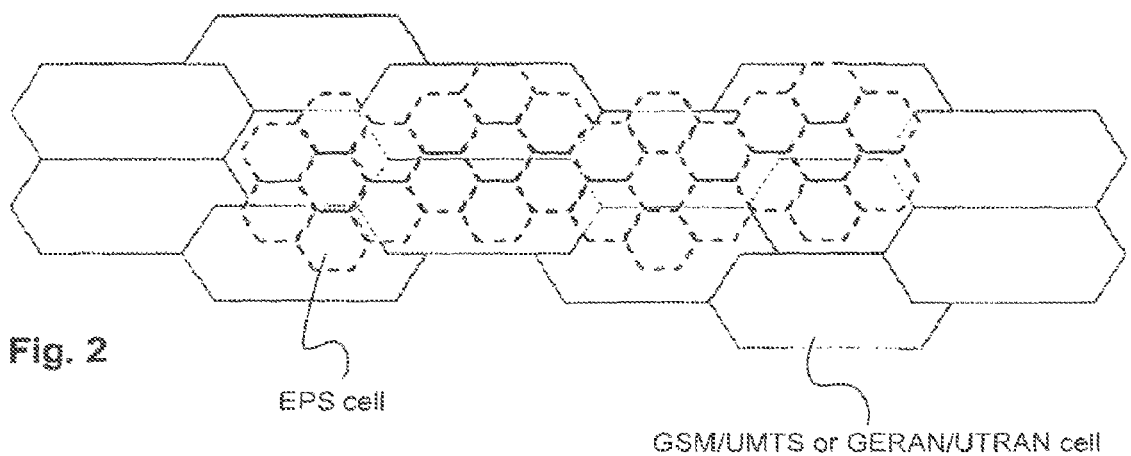
FIG. 2 schematically illustrate a multitude of radio cells of two different radio access networks.

In FIG. 2, a multitude of radio cells of two different radio access networks are schematically shown. The different size of the radio cells has the consequence that a Tracking Area (TA)—Location Area (LA) mismatch occurs. For example, the small network cells are Evolved Packet System (EPS) cells, a plurality thereof having a unique Tracking Area Code (TAC), and the bigger network cells are GSM/UMTS cells (or GERAN/UTRAN cells), a plurality thereof having a unique Location Area Code (LAC). As can be seen, it is not possible in this example to map a unique Location Area (LA) based on the knowledge of the Tracking Area of the User Equipment.

Some exemplary embodiments are described in further detail below:

First Embodiment

Method for the use of a GSM/UMTS mobile communication network by a User Equipment (20) attached to a core network (10) of an Evolved Packet System (EPS) mobile communication network, wherein the use of the GSM/UMTS mobile communication network is the result of a fallback operation, wherein prior to an invocation of a service that triggers the fallback operation at least one of the following steps occurs:

- an updating operation regarding the assignment of a Location Area Code (LAC) and/or a serving Mobile Switching Center (MSC) to the User Equipment (20) is performed, the updating operation being an additional TAU (Tracking Area Update) operation or a modified TAU operation or a dedicated operation and/or
- a measurement operation regarding a current GERAN/UTRAN radio environment of the User Equipment (20) is performed.

Second Embodiment

Method according to the first embodiment, wherein the updating operation and/or the measurement operation regarding the current GERAN/UTRAN radio environment of the User Equipment (20) is executed in case that the User Equipment (20) is attached to the Evolved Packet System (EPS) and to the GSM/UMTS mobile communication network.

Third Embodiment

Method according to one of the preceding embodiments, wherein the execution of the updating operation is dependent on at least one of the following:

- the updating operation has a repetition period which is reduced compared to a TAU operation using timer 3412,
- the updating operation is executed in case that a serving E-UTRAN cell changes,
- the updating operation is executed after a maximum time period after the last updating operation or after the last change of the User Equipment (20) from active mode to idle mode,
- the updating operation is executed on request from the core network (10),
- the updating operation is executed in case that the User Equipment (20) detects a movement of the User Equipment (20),
- the updating operation is executed in case that the User Equipment (20) detects that at least one of the candidate target GERAN/UTRAN cells for a fallback operation belong to a different location area than the one that is currently assigned to the User Equipment (20).

Fourth Embodiment

Method according to one of the preceding embodiments, wherein the updating operation includes the exchange of at least an information dependent on at least one of the following:
- a movement information regarding a movement of the User Equipment (20) since the previous updating operation,
- a radio environment information regarding current receivable GERAN/UTRAN neighbor cells and/or their Location Area,
- a radio environment information regarding current receivable E-UTRAN neighbor cells and/or their Tracking Area.

Fifth Embodiment

Method according to one of the preceding embodiments, wherein the measurement operation regarding the current GERAN/UTRAN radio environment of the User Equipment (20) in the GSM/UMTS mobile communication network is dependent on at least one of the following:
- the measurement operation regarding the current GERAN/UTRAN radio environment of the User Equipment (20) has a predetermined repetition period,
- the measurement operation regarding the current GERAN/UTRAN radio environment of the User Equipment (20) is executed in case that a serving E-UTRAN cell changes,
- the measurement operation regarding the current GERAN/UTRAN radio environment of the User Equipment (20) is executed after a maximum time period after the last change of the User Equipment (20) from active mode to idle mode,
- the measurement operation regarding the current GERAN/UTRAN radio environment of the User Equipment (20) is executed in case that the User Equipment (20) detects a movement of the User Equipment (20),
- the measurement operation regarding the current GERAN/UTRAN radio environment of the User Equipment (20) is executed in case that the User Equipment (20) detects that at least one of the candidate target GERAN/UTRAN cells for a fallback operation belong to a different location area than the one that is currently assigned to the User Equipment (20),
- the measurement operation regarding the current GERAN/UTRAN radio environment of the User Equipment (20) is executed in case that an application of the User Equipment (20) is activated typically requiring GSM/UMTS connectivity, especially a telephony application.

Sixth Embodiment

Method according to one of the preceding embodiments, wherein the User Equipment (20) comprises a first radio interface (21) and a second radio interface (22), the first radio interface (21) being able to be used for a communication of the User Equipment (20) in the Evolved Packet System (EPS) and the second radio interface (22) being able to be used for at least one out of:
- a monitoring operation regarding an overall current radio environment of the User Equipment (20), or
- the measurement operation regarding the receivable GERAN/UTRAN neighbor cells, or
- the observation to detect that (some of) the candidate target cells for a CSFB belong to a different Location Area than the one that is currently assigned to the User Equipment (20).

Seventh Embodiment

User Equipment (20) for the use of a GSM/UMTS mobile communication network by the User Equipment (20) being attached to a core network (10) of an Evolved Packet System (EPS) mobile communication network, wherein the use of the GSM/UMTS mobile communication network is the result of a fallback operation, wherein the User Equipment (20) is provided such that an updating operation regarding the assignment of a Location Area Code (LAC) and/or a serving Mobile Switching Center (MSC) to the User Equipment (20), the updating operation being an additional TAU (Tracking Area Update) operation or a modified TAU operation or a dedicated operation and/or a measurement operation regarding the current GERAN/UTRAN radio environment of the User Equipment (20) is performed prior to an invocation of a service that triggers the fallback operation.

Eighth Embodiment

User Equipment (20) according to the seventh embodiment, wherein the execution of the updating operation is dependent on at least one of the following:
- the updating operation has a repetition period which is reduced compared to a TAU operation using timer 3412,
- the updating operation is executed in case that a serving E-UTRAN cell changes,
- the updating operation is executed after a maximum time period after the last updating operation or after the last change from active mode to idle mode,
- the updating operation is executed on request from the core network (10),
- the updating operation is executed in case that the User Equipment (20) detects a movement of the User Equipment (20),
- the updating operation is executed in case that the User Equipment (20) detects that at least one of the candidate target GERAN/UTRAN cells for a fallback operation belong to a different location area than the one that is currently assigned to the User Equipment (20).

Ninth Embodiment

User Equipment (20) according to the seventh or eighth embodiment, wherein the updating operation includes the exchange of at least an information dependent on at least one of the following:
- a movement information regarding a movement of the User Equipment (20) since the previous updating operation,
- a radio environment information regarding current receivable GERAN/UTRAN neighbor cells and/or their Location Area,
- a radio environment information regarding current receivable E-UTRAN neighbor cells and/or their Tracking Area.

Tenth Embodiment

User Equipment (20) according to one of the seventh to the nineth embodiments, wherein the measurement operation regarding the current GERAN/UTRAN radio environment of the User Equipment (20) in the GSM/UMTS mobile communication network is dependent on at least one of the following:

the measurement operation regarding the current GERAN/UTRAN radio environment of the User Equipment (20) has a predetermined repetition period, the measurement operation regarding the current GERAN/UTRAN radio environment of the User Equipment (20) is executed in case that a serving E-UTRAN cell changes, the measurement operation regarding the current GERAN/UTRAN radio environment of the User Equipment (20) is executed after a maximum time period after the last change of the User Equipment (20) from active mode to idle mode, the updating operation is executed on request from the core network (10), the measurement operation regarding the current GERAN/UTRAN radio environment of the User Equipment (20) is executed in case that the User Equipment (20) detects a movement of the User Equipment (20), the measurement operation regarding the current GERAN/UTRAN radio environment of the User Equipment (20) is executed in case that the User Equipment (20) detects that at least one of the candidate target GERAN/UTRAN cells for a fallback operation belong to a different location area than the one that is currently assigned to the User Equipment (20), the measurement operation regarding the current GERAN/UTRAN radio environment of the User Equipment (20) is executed in case that an application of the User Equipment (20) is activated typically requiring GSM/UMTS connectivity, especially a telephony application.

Eleventh Embodiment

User Equipment (20) according to one of the seventh to the tenth embodiments, wherein the User Equipment (20) comprises a GNSS (Global Navigational Satellite System) module and/or an acceleration sensor for detecting a movement or a change of the position of the User Equipment (20).

Twelfth Embodiment

User Equipment (20) according to one of the seventh to the eleventh embodiments, wherein the User Equipment (20) comprises a first radio interface (21) and a second radio interface (22), the first radio interface (21) being able to be used for a communication of the User Equipment (20) in the Evolved Packet System (EPS) and the second radio interface (22) being able to be used for at least one out of:

a monitoring operation regarding an overall current radio environment of the User Equipment (20), or the measurement operation regarding the receivable GERAN/UTRAN neighbor cells, or the observation to detect that (some of) the candidate target cells for a CSFB belong to a different Location Area than the one that is currently assigned to the User Equipment (20).

Thirteenth Embodiment

Core Network (10) of an Evolved Packet System (EPS) mobile communication network for the use of a GSM/UMTS mobile communication network by a User Equipment (20) being attached to the core network (10), wherein the use of the GSM/UMTS mobile communication network is the result of a fallback operation, wherein the User Equipment (20) is provided such that an updating operation regarding the assignment of a Location Area Code (LAC) and/or a serving Mobile Switching Center (MSC) to the User Equipment (20), the updating operation being an additional TAU (Tracking Area Update) operation or a modified TAU operation or a dedicated operation and/or a measurement operation regarding the current GERAN/UTRAN radio environment of the User Equipment (20) is performed prior to an invocation of a service that triggers the fallback operation.

Fourteenth Embodiment

Program comprising a computer readable program code for controlling a User Equipment (20) attached to a core network (10) of an Evolved Packet System (EPS) mobile communication network for the use of a GSM/UMTS mobile communication network by a User Equipment (20) being attached to the core network (10), wherein the use of the GSM/UMTS mobile communication network is the result of a fallback operation, wherein the User Equipment (20) is provided such that an updating operation regarding the assignment of a Location Area Code (LAC) and/or a serving Mobile Switching Center (MSC) to the User Equipment (20), the updating operation being an additional TAU (Tracking Area Update) operation or a modified TAU operation or a dedicated operation and/or a measurement operation regarding the current GERAN/UTRAN radio environment of the User Equipment (20) is performed prior to an invocation of a service that triggers the fallback operation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention claimed is:

1. A method for use of a Global System of Mobile Communication (GSM) and Universal Mobile Telecommunication System (UMTS) (GSM/UMTS) mobile communication network by a user equipment attached to a core network of an Evolved Packet System (EPS) mobile communication network, the method comprising:

invoking a service that triggers a fallback operation;
using the GSM/UMTS mobile communication network in response to the fallback operation being triggered;
wherein the method further comprises, prior to invoking the service that triggers the fallback operation:
performing an updating operation regarding assignment of a Location Area Code (LAC) and/or a serving Mobile Switching Center (MSC) to the user equipment, the updating operation being:
  a dedicated operation specific to the assignment or reassignment of the LAC and/or the serving MSC; or
  a modified Tracking Area Update (TAU) operation;
wherein execution of the updating operation is dependent on at least one of the following:
the updating operation has a repetition period which is reduced compared to a TAU operation using timer 3412,
the updating operation is executed in case that a serving Evolved-UTRAN (E-UTRAN) cell changes,
the updating operation is executed after a maximum time period after the last updating operation or after a last change of the user equipment from active mode to idle mode,
the updating operation is executed on request from the core network,
the updating operation is executed in case that the user equipment detects a movement of the user equipment, or
the updating operation is executed in case that the user equipment detects that at least one of the candidate target GERAN/UTRAN cells for a fallback operation belongs to a different location area than the one that is currently assigned to the user equipment.

2. The method according to claim 1, wherein the updating operation is executed in case that the user equipment is attached to the EPS and to the GSM/UMTS mobile communication network.

3. A method for use of a Global System of Mobile Communication (GSM) and Universal Mobile Telecommunication System (UMTS) (GSM/UMTS) mobile communication network by a user equipment attached to a core network of an Evolved Packet System (EPS) mobile communication network:

invoking a service that triggers a fallback operation;
using the GSM/UMTS mobile communication network in response to the fallback operation being triggered;
wherein the method further comprises, prior to invoking the service that triggers the fallback operation:
performing an updating operation regarding assignment of a Location Area Code (LAC) and/or a serving Mobile Switching Center (MSC) to the user equipment, the updating operation being:
  a dedicated operation specific to the assignment or reassignment of the LAC and/or the serving MSC; or
  a modified Trackin Area Update (TAU) operation;
wherein the updating operation includes exchange of information dependent on at least one of the following:
movement information regarding a movement of the user equipment since a previous updating operation,
radio environment information regarding current receivable GERAN/UTRAN neighbor cells and/or their Location Area, or
radio environment information regarding current receivable Evolved-UTRAN (E-UTRAN) neighbor cells and/or their Tracking Area.

4. A method for use of a Global System of Mobile Communication (GSM) and Universal Mobile Telecommunication System (UMTS) (GSM/UMTS) mobile communication network by a user equipment attached to a core network of an Evolved Packet System (EPS) mobile communication network, the method comprising:

invoking a service that triggers a fallback operation;
using the GSM/UMTS mobile communication network in response to the fallback operation being triggered;
wherein the method further comprises, prior to invoking the service that triggers the fallback operation:
performing, autonomously by the user equipment, a measurement operation regarding a current General Packet Radio System (GPRS)/EDGE Radio Access Network (GERAN) or UMTS Terrestrial Radio Access Network (UTRAN) (GERAN/UTRAN) radio environment in order to identify potential Circuit Switched Fallback (CSFB) target cells of the user equipment;
wherein the measurement operation regarding the current GERAN/UTRAN radio environment of the user equipment in the GSM/UMTS mobile communication network is dependent on at least one of the following:
the measurement operation regarding the current GERAN/UTRAN radio environment of the user equipment has a predetermined repetition period,
the measurement operation regarding the current GERAN/UTRAN radio environment of the user equipment is executed in case that a serving E-UTRAN cell changes,
the measurement operation regarding the current GERAN/UTRAN radio environment of the user equipment is executed after a maximum time period after the last change of the user equipment from active mode to idle mode,
the measurement operation regarding the current GERAN/UTRAN radio environment of the user equipment is executed in case that the user equipment detects a movement of the user equipment,
the measurement operation regarding the current GERAN/UTRAN radio environment of the user equipment is executed in case that the user equipment detects that at least one of the candidate target GERAN/UTRAN cells for a fallback operation belong to a different location area than the one that is currently assigned to the user equipment, or
the measurement operation regarding the current GERAN/UTRAN radio environment of the user equipment is executed in case that an application of the user equipment is activated typically requiring GSM/UMTS connectivity, especially a telephony application.

5. A method for use of a Global System of Mobile Communication (GSM) and Universal Mobile Telecommunication System (UMTS) (GSM/UMTS) mobile communication network by a user equipment attached to a core network of an Evolved Packet System (EPS) mobile communication network, the method comprising:

invoking a service that triggers a fallback operation;
using the GSM/UMTS mobile communication network in response to the fallback operation being triggered;
wherein the method further comprises, prior to invoking the service that triggers the fallback operation:
performing an updating operation regarding assignment of a Location Area Code (LAC) and/or a serving Mobile Switching Center (MSC) to the user equipment, the updating operation being:

a dedicated operation specific to the assignment or reassignment of the LAC and/or the serving MSC; or a modified Tracking Area Update (TAU) operation; and/or performing, autonomously by the user equipment, a measurement operation regarding a current General Packet Radio System (GPRS)/EDGE Radio Access Network (GERAN) or UMTS Terrestrial Radio Access Network (UTRAN) (GERAN/UTRAN) radio environment in order to identify potential Circuit Switched Fallback (CSFB) target cells of the user equipment;

wherein the user equipment comprises a first radio interface and a second radio interface, the first radio interface being able to be used for a communication of the user equipment in the Evolved Packet System (EPS) and the second radio interface being able to be used for at least one out of:

a monitoring operation regarding an overall current radio environment of the user equipment, the measurement operation regarding the receivable GERAN/UTRAN neighbor cells, or the observation to detect that one or more of the candidate target cells for a CSFB belong to a different Location Area than the one that is currently assigned to the user equipment.

* * * * *